(12) United States Patent
Wang et al.

(10) Patent No.: US 11,277,300 B2
(45) Date of Patent: Mar. 15, 2022

(54) METHOD AND APPARATUS FOR OUTPUTTING INFORMATION

(71) Applicant: Beijing Baidu Netcom Science and Technology Co., Ltd., Beijing (CN)

(72) Inventors: Xuanjun Wang, Beijing (CN); Hua Chen, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 0 days.

(21) Appl. No.: 16/946,069

(22) Filed: Jun. 4, 2020

(65) Prior Publication Data

US 2021/0144048 A1    May 13, 2021

(30) Foreign Application Priority Data

Nov. 13, 2019 (CN) .......................... 201911106266.3

(51) Int. Cl.
*H04L 12/24* (2006.01)
*H04L 41/0604* (2022.01)
*H04L 41/0677* (2022.01)
*H04L 41/0631* (2022.01)
*H04L 41/0273* (2022.01)

(52) U.S. Cl.
CPC ...... *H04L 41/0622* (2013.01); *H04L 41/0286* (2013.01); *H04L 41/064* (2013.01); *H04L 41/0677* (2013.01)

(58) Field of Classification Search
CPC ... H04L 29/08072; H04L 29/06; H04L 43/00; H04L 12/2602; H04L 41/22; H04L 29/0854; H04L 29/0809; H04L 41/0677; H04L 41/0286; G06F 1/14
See application file for complete search history.

(56) References Cited

U.S. PATENT DOCUMENTS

| | | | |
|---|---|---|---|
| 2004/0119736 A1* | 6/2004 | Chen ..................... | H04L 41/069 715/736 |
| 2011/0154342 A1* | 6/2011 | Logan .................. | G06Q 10/109 718/101 |
| 2014/0317286 A1* | 10/2014 | Masuda .............. | G06F 11/3051 709/224 |
| 2016/0110669 A1* | 4/2016 | Iyer .................. | G06Q 10/06315 705/7.25 |
| 2017/0078445 A1* | 3/2017 | Andrews ................. | H04L 67/34 |
| 2017/0364863 A1* | 12/2017 | Kessel .................. | G06Q 10/10 |
| 2018/0070120 A1* | 3/2018 | Shen ................ | H04N 21/25891 |

(Continued)

*Primary Examiner* — Abdullahi E Salad
(74) *Attorney, Agent, or Firm* — Weaver Austin Villeneuve & Sampson LLP

(57) ABSTRACT

Embodiments of the present disclosure provide a method and apparatus for outputting information. The method includes: summarizing event information into an event database in response to receiving the event information, where the event information includes an event start time, an event end time, a machine name, and an event content; associating and storing event information of a same machine name; querying an event database for event information including a target machine name and an event end time greater than or equal to a predetermined time before a current time and an event start time less than or equal to the current time, in response to receiving a query request including the target machine name; and outputting queried event information.

15 Claims, 5 Drawing Sheets

(56) References Cited

U.S. PATENT DOCUMENTS

2019/0180322 A1* 6/2019 Zhang ............... G06Q 30/0207
2020/0028890 A1* 1/2020 White .................... H04L 41/12
2020/0067790 A1* 2/2020 Hsiao ..................... H04L 41/22

* cited by examiner

METHOD AND APPARATUS FOR OUTPUTTING INFORMATION

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and more particularly, to a method and apparatus for outputting information.

BACKGROUND

Cloud computing services are increasingly being used. The system is unavoidable to fail at runtime. The current solution is that, when the fault occurs, the operation and maintenance personnel involved in cloud computing services need to track and locate respectively when they are not sure whether it is a fault for their own services, and manually communicate the tracing progress, so that efficiency is low.

For each service, the information required in the positioning process is scattered in different places and cannot be quickly acquired. There is no mechanism for synchronizing information between services in a timely manner, and there is no automated means, and the services can only be performed manually, thereby causing additional labor consumption and time-consuming positioning.

SUMMARY

Embodiments of the present disclosure provide a method and apparatus for outputting information.

In a first aspect, an embodiment of the present disclosure provides a method for outputting information, including: summarizing event information into an event database in response to receiving the event information, where the event information includes an event start time, an event end time, a machine name, and an event content; associating and storing event information of a same machine name; querying an event database for event information including a target machine name and an event end time greater than or equal to a predetermined time before a current time and an event start time less than or equal to the current time, in response to receiving a query request including the target machine name; and outputting queried event information.

In some embodiments, the query request further includes a query start time and a query end time; and the method further includes: querying the event database event for event information including the target machine name and an event end time greater than or equal to a query start time and an event start time less than or equal to a query end time.

In some embodiments, the event content includes an event type, the event type comprising a warning event and a change event; and the method further includes: determining a change event related to the warning event from the queried event information.

In some embodiments, the event content further includes a service level; and the method further includes: determining the change event related to the warning event from the queried event information of a same service level.

In some embodiments, the outputting queried event information includes: outputting the queried event information in an order from near to far according to the event end time.

In a second aspect, an embodiment of the present disclosure provides an apparatus for outputting information, including: a receiving unit configured to summarize event information into an event database in response to receiving the event information, where the event information includes an event start time, an event end time, a machine name, and an event content; an association unit configured to associate and store event information of a same machine name; a query unit configured to query an event database for event information including a target machine name and an event end time greater than or equal to a predetermined time before a current time and an event start time less than or equal to the current time, in response to receiving a query request including the target machine name; and an output unit configured to output queried event information.

In some embodiments, the query request further includes a query start time and a query end time; and the query unit is further configured to: query the event database event for event information including the target machine name and an event end time greater than or equal to a query start time and an event start time less than or equal to a query end time.

In some embodiments, the event content comprises an event type the event type including a warning event and a change event; and the apparatus further includes an analysis unit configured to: determine a change event related to the warning event from the queried event information.

In some embodiments, the event content further includes a service level; and the analysis unit is further configured to: determining the change event related to the warning event from the queried event information of a same service level.

In some embodiments, the output unit is further configured to: output the queried event information in an order from near to far according to the event end time.

In a third aspect, an embodiment of the present disclosure provides an electronic device including: one or more processors; and a storage apparatus storing one or more programs, where the one or more programs, when executed by the one or more processors, cause the one or more processors to implement the method of any embodiment in the first aspect.

In a fourth aspect, an embodiment of the present disclosure provides a computer readable medium, storing a computer program thereon, where the program, when executed by a processor, implements the method of any embodiment in the first aspect.

According to the method and apparatus for outputting information provided in the embodiments of the present disclosure, by associating events from a plurality of sources and providing a capability of quick query, all events within a similar time period can be quickly queried when a large-scale fault occurs, thereby solving a problem that a plurality of services cannot be quickly co-located when a large-scale fault occurs, resulting in inefficient positioning.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION

Figure 1:
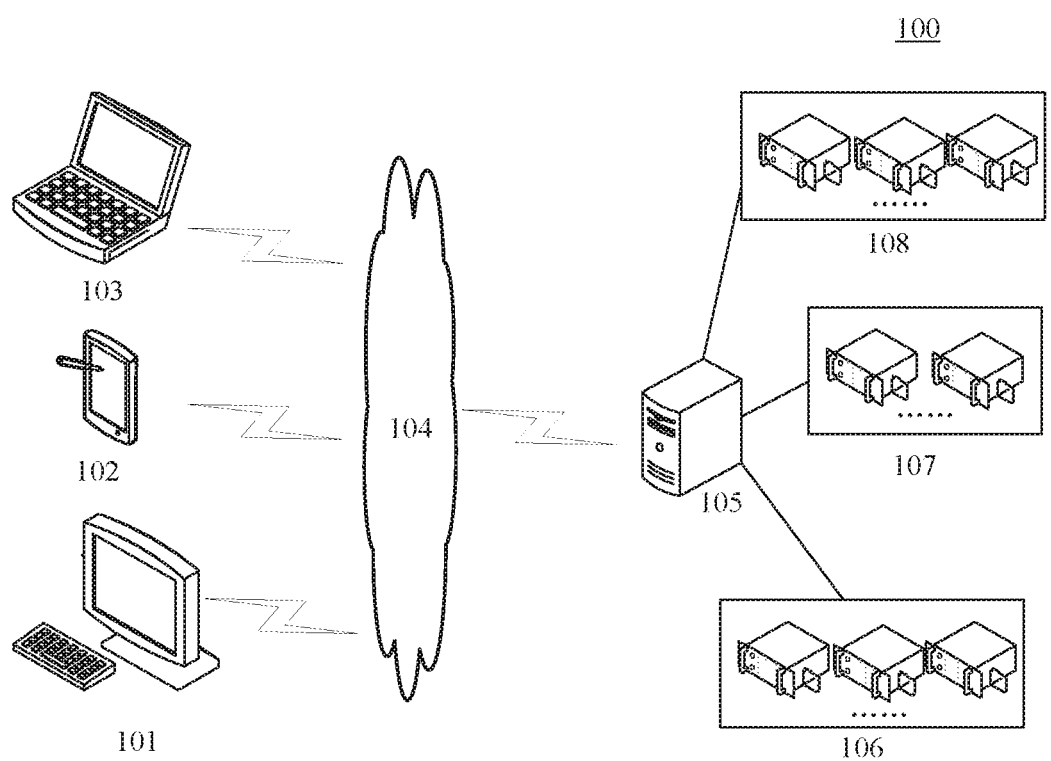
FIG. 1 is an exemplary system architecture diagram in which an embodiment of the present disclosure may be applied.

The present disclosure is described in further detail below with reference to accompanying drawings and embodiments. It is to be understood that the specific embodiments described herein are merely illustrative of the related disclosure and are not restrictive of the disclosure. It is also to be noted that, for ease of description, only parts related to the disclosure are shown in the drawings.

It is noted that the embodiments in the present disclosure and the features in the embodiments may be combined with each other without conflict. The present disclosure will now be described in detail with reference to the accompanying drawings and examples.

FIG. 1 illustrates an exemplary system architecture 100 in which of a method for outputting information or an apparatus for outputting information of an embodiment of the present disclosure may be applied.

As shown in FIG. 1, the system architecture 100 may include terminal devices 101, 102, 103, a network 104, a management server 105, and computing servers 106, 107, and 108. The network 104 serves to provide a medium of communication links between the terminal devices 101, 102, 103, the server 105, and the computing servers 106, 107, 108. Network 104 may include various types of connections, such as wired, wireless communication links, or fiber optic cables, among others.

The user may interact with the management server 105 through the network 104 using the terminal devices 101, 102, 103 to receive or send messages, etc. Various communication client applications such as a web browser application, a shopping application, a search application, an instant messaging tool, a mailbox client, social platform software, and the like may be installed on the terminal devices 101, 102, 103.

The terminal devices 101, 102, 103 may be hardware or software. When the terminal devices 101, 102, 103 are hardware, the terminal devices 101, 102, 103 may be various electronic devices having a display screen and supporting web page browsing, including but not limited to a smartphone, a tablet computer, an electronic book reader, an MP3 player (Moving Picture Experts Group Audio Layer III), a MP4 (Moving Picture Experts Group Audio Layer IV), a laptop portable computer, a desktop computer, and the like. When the terminal devices 101, 102, and 103 are software, they may be installed in the electronic devices listed above. It may be implemented as a plurality of pieces of software or software modules (e.g., for providing distributed services) or as a single piece of software or software module. It is not specifically limited herein.

The management server 105 may be a server providing various services, for example, a troubleshooting server providing a query service for a failure query request sent by the terminal devices 101, 102, 103. The troubleshooting server may receive the event information reported by the computing servers 106, 107, and 108 for association, and perform screening according to the time and the machine during fault location, so as to quickly acquire events with similar fault time points and perform auxiliary fault location. The query result is then fed back to the terminal device.

It should be noted that the computing servers 106, 107, 108 may be hardware or software. When the computing servers 106, 107, 108 are hardware, the computing servers 106, 107, 108 may be implemented as a distributed server cluster of multiple servers, or may be implemented as a single server. When the server is software, it may be implemented as a plurality of pieces of software or software modules (e.g., a plurality of pieces of software or software modules for providing distributed services), or it may be implemented as a single piece of software or software module. It is not specifically limited herein.

It should be noted that the method for outputting information provided in the embodiments of the present disclosure is generally performed by the server 105, and accordingly, the apparatus for outputting information is generally provided in the server 105.

It should be understood that the number of terminal devices, networks, management servers, computing servers in FIG. 1 is merely illustrative. There may be any number of terminal devices, networks, management servers, and computing servers as required for implementation.

Figure 2:
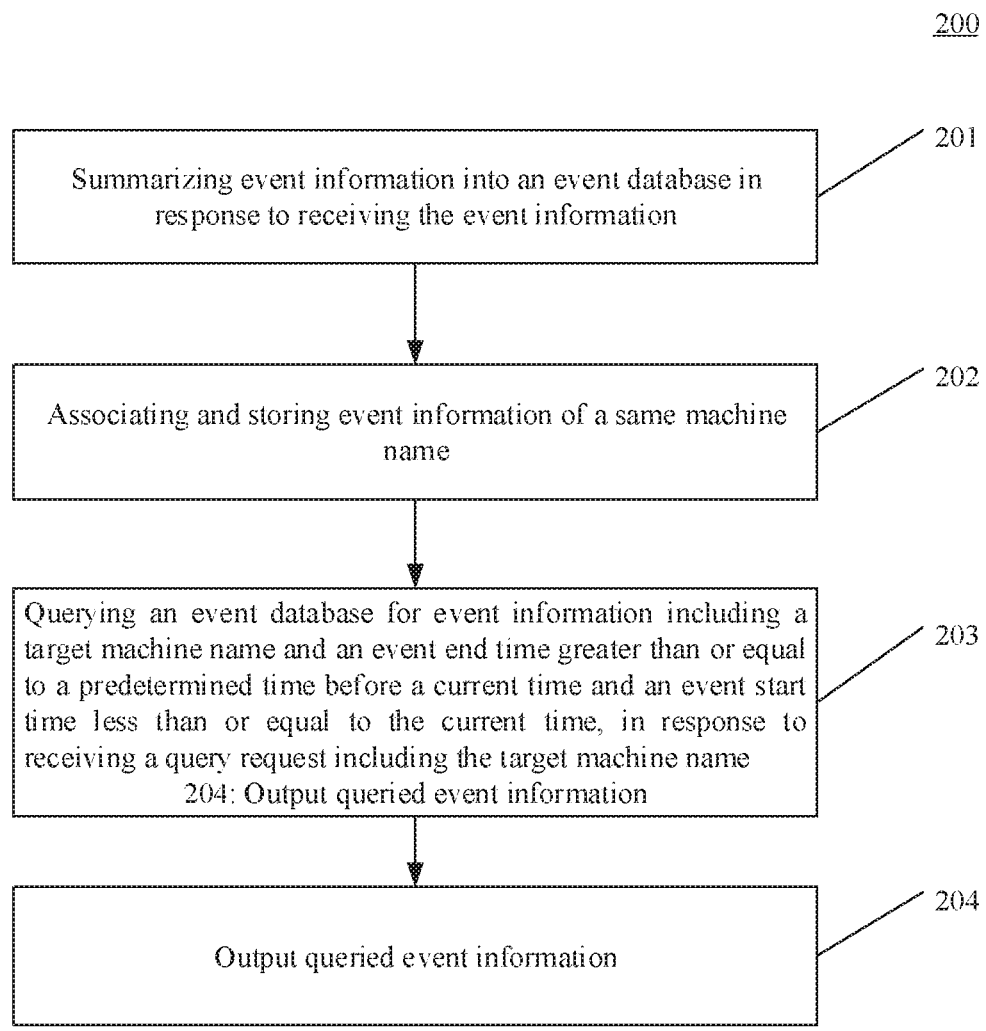
FIG. 2 is a flowchart of a method for outputting information according to an embodiment of the present disclosure.

With continuing reference to FIG. 2, a flow 200 of a method for outputting information in accordance with an embodiment of the present disclosure is shown. The method for outputting information includes the following steps.

Step 201, summarizing event information into an event database in response to receiving the event information.

In the present embodiment, the executing body (e.g., the management server shown in FIG. 1) of the method for outputting information may receive event information from a computing server performing a cloud computing task through a wired connection mode or a wireless connection mode. The event information includes an event start time, an event end time, a machine name, and an event content. The event information is pushed to the management server in real time. After receiving the event information, the management server summarizes the event information to a given event database. An event refers to a phenomenon that occurs during the operation of a system and satisfies a particular rule. An event persists for a period of time, which is described by an event start time and an event end time. The machine name is an identifier of a physical machine. The machine name may be a specific name or an IP address. The machine name may be determined from the source address of the received event information. An event source is a source for generating event information, and may include a virtual machine, a platform, an operating system, and the like. The purpose of present disclosure is to query events that may cause a failure in the event of a failure of a physical machine, thereby assisting the user in clearing the failure.

In some alternative implementations of the present embodiment, the event content may include an event type, and may further include a service level. Event type may include a change event, a warning events, and the like. The event content may be represented as follows.

| Service level | Change event | Warning event |
|---|---|---|
| Physical layer | Change event of server, physical network, switch | Capacity, availability, quality events |
| Service layer | Upper-layer service program change, and operation change event | Traffic level alarm events such as log alarms, port alarms, etc. |

Step 202, associating and storing event information of a same machine name.

In the present embodiment, the attributes of the events are different due to different sources of the events, and if the events are to be correlated, at least one attribute must be the same. In the embodiment of the present disclosure, a machine name association manner is selected to associate event information from various sources.

Step 203, querying an event database for event information including a target machine name and an event end time greater than or equal to a predetermined time before a current time and an event start time less than or equal to the current time, in response to receiving a query request including the target machine name.

Figure 3:
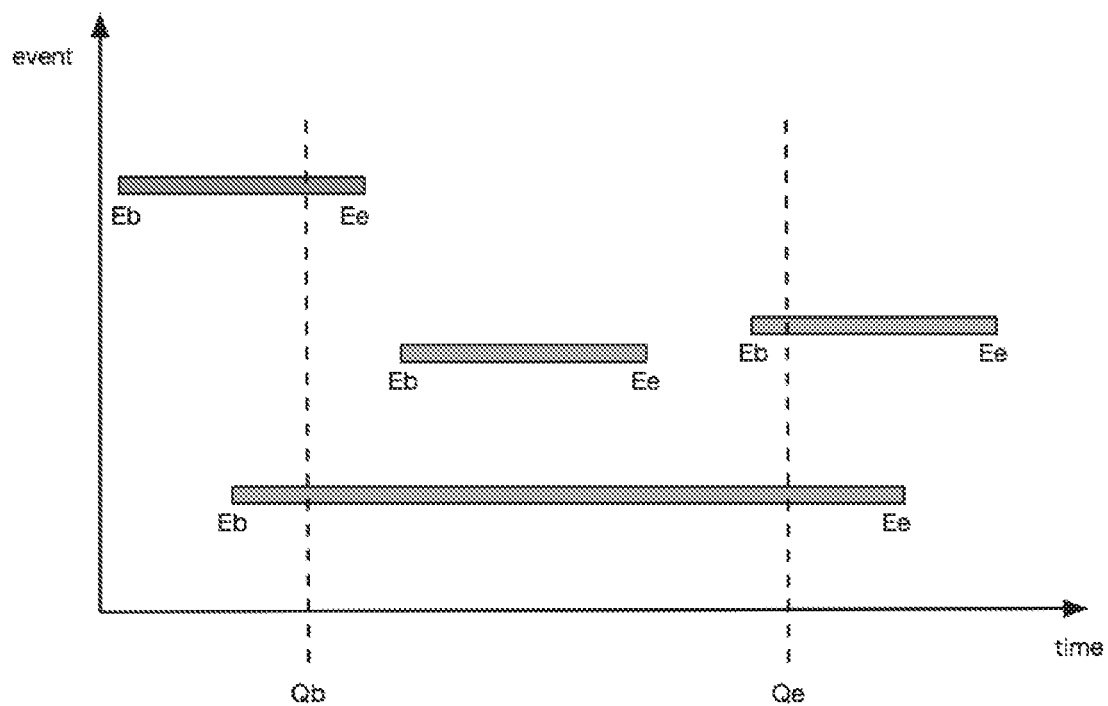
FIG. 3 is a schematic diagram of an application scenario of a method for outputting information according to an embodiment of the present disclosure.

In the present embodiment, the event query is designed as two filtering conditions, that is, a machine name and a time period. In order to describe the event duration, the event start time Eb, the event end time Ee, the query start time Qb, and the query end time Qe are defined, and the event duration and the query time are related to each other by four types as shown in FIG. 3.

1. Qb>=Eb && Qe<=Ee
2. Qb>=Eb && Qe>Ee
3. Qb<Eb && Qe<=Ee
4. Qb<Eb && Qe>Ee

The simplified expression is: Ee>=Qb && Eb<=Qe.

That is, a result of the query should include a target machine name, and event information with an event end time greater than or equal to a query start time and an event start time less than or equal to a query end time. The query end time may be the current time, and the query start time may be a predetermined time before the current time. If the user does not specify the period of time for the query, the default is to check forward the event information at a predetermined time starting from the current time. The predetermined time may be half an hour. The user may alternatively specify the query start time and query end time directly in the query request.

Step 204: output queried event information.

In the present embodiment, the query result may be output in order from near to far at the time when the event information is received. Alternatively, the queried event information may be output in order of event end time from near to far.

Figure 4:
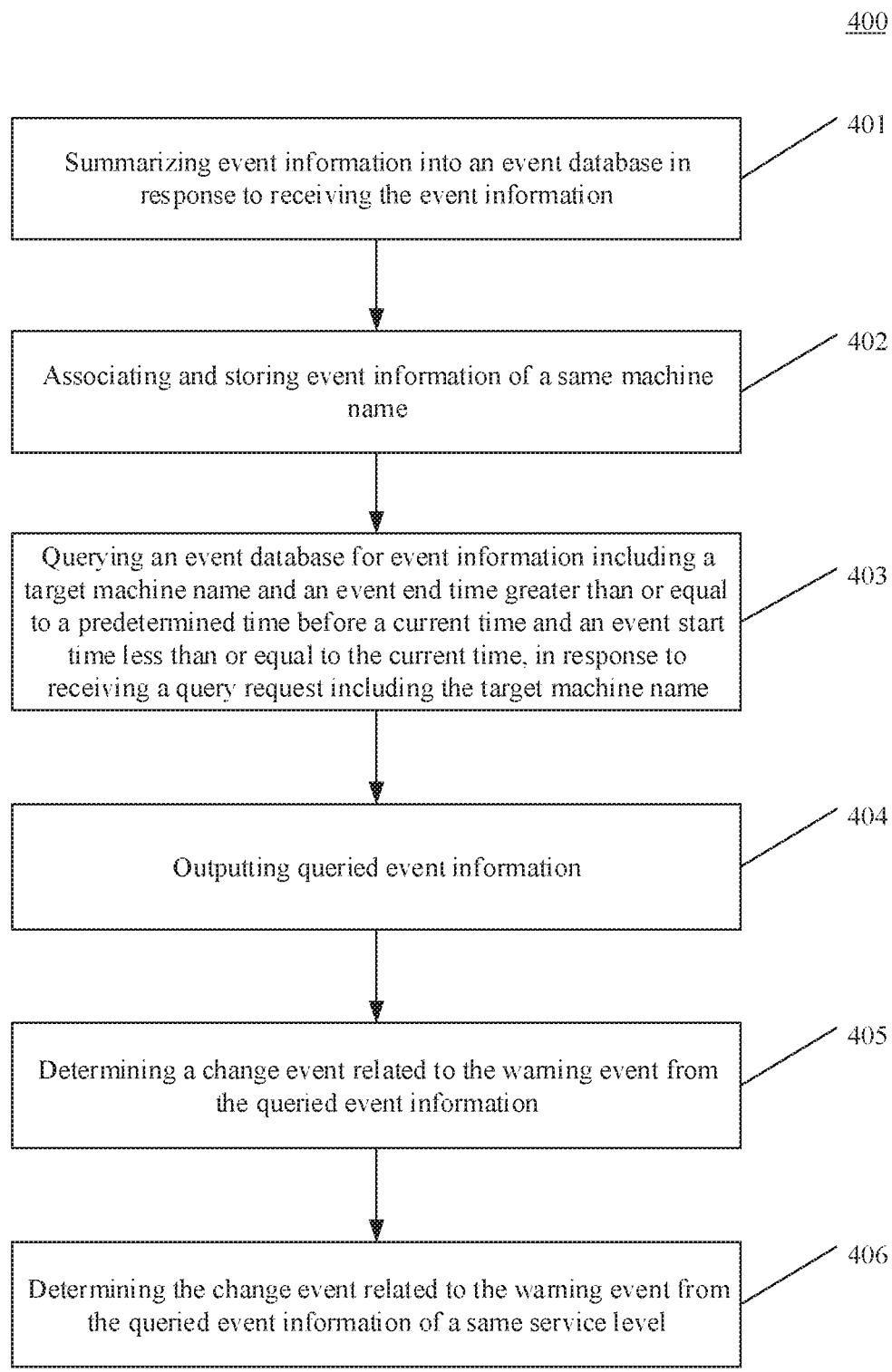
FIG. 4 is a flowchart of a method for outputting information according to another embodiment of the present disclosure.

Referring further to FIG. 4, there is shown a flow 400 of a method for outputting information according to another embodiment. The flow 400 of the method for outputting information includes the following steps.

Step 401, summarizing event information into an event database in response to receiving the event information.

Step 402, associating and storing event information of a same machine name.

Step 403, querying an event database for event information including a target machine name and an event end time greater than or equal to a predetermined time before a current time and an event start time less than or equal to the current time, in response to receiving a query request including the target machine name.

Step 404: outputting queried event information.

Since steps 401-404 are substantially the same as steps 201-204, details thereof are not described herein.

Step 405, determining a change event related to the warning event from the queried event information.

In the present embodiment, the event content includes an event type, the event type including a warning event and a change event. A change event that triggers a warning may be determined through warning information. Relevant change event may be found by keyword matching, or semantic analysis. For example, the warning information is "capacity overflow", and the change information includes: 1. the virtual machine reduces the capacity; 2. the switch switches; 3. the network is interrupted. The change information related to the warning information "capacity overflow" may then be determined as "the virtual machine reduces the capacity".

Step 406: determining the change event related to the warning event from the queried event information of a same service level.

In the present embodiment, if there are a plurality of change events related to the warning event, the change event of the same service level as the warning event may be selected by further screening through the service level. Therefore, the troubleshooting range is further reduced.

In embodiments of the present disclosure, by associating events of different sources, events occurring at a specified time when a fault occurs can be quickly obtained, thereby reducing the fault location range and effectively improving the fault location efficiency.

Figure 5:
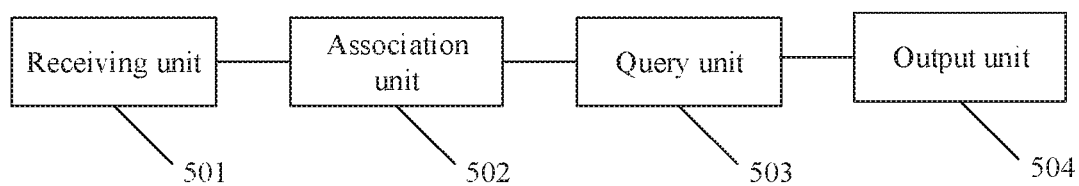
FIG. 5 is a schematic structural diagram of an apparatus for outputting information according to an embodiment of the present disclosure.

With further reference to FIG. 5, as an implementation of the method shown in each of the above figures, an embodiment of the present disclosure provides an apparatus for outputting information. The apparatus embodiment corresponds to the method embodiment shown in FIG. 2, and the apparatus is particularly applicable to various electronic devices.

As shown in FIG. 5, the apparatus 500 for outputting information in the present embodiment includes: a receiving unit 501, an association unit 502, a query unit 503, and an output unit 504. The receiving unit 501 is configured to summarize event information into an event database in response to receiving the event information, where the event information includes an event start time, an event end time, a machine name, and an event content. The association unit 502 is configured to associate and store event information of a same machine name. The query unit 503 is configured to query an event database for event information including a target machine name and an event end time greater than or equal to a predetermined time before a current time and an event start time less than or equal to the current time, in response to receiving a query request including the target machine name. The output unit 504 is configured to output queried event information.

In the present embodiment, the specific processing of the receiving unit 501, the association unit 502, the query unit 503, and the output unit 504 of the apparatus 500 for outputting information may refer to step 201, step 202, step 203, and step 204 in the corresponding embodiment of FIG. 2.

In some alternative implementations of the present embodiment, the query request further includes a query start time and a query end time; and the query unit 503 is further configured to query the event database event for event information including the target machine name and an event end time greater than or equal to a query start time and an event start time less than or equal to a query end time.

In some alternative implementations of the present embodiment, the event content includes an event type, the event type including a warning event and a change event; and the apparatus 500 further includes an analysis unit (not shown in the figure) configured to determine a change event related to the warning event from the queried event information.

In some alternative implementations of the present embodiment, the event content further includes a service level; and the analysis unit is further configured to determine a change event related to the warning event from the queried event information of a same service level.

In some alternative implementations of the present embodiment, the output unit is further configured to output the queried event information in a near-far order according to the event end time.

Figure 6:
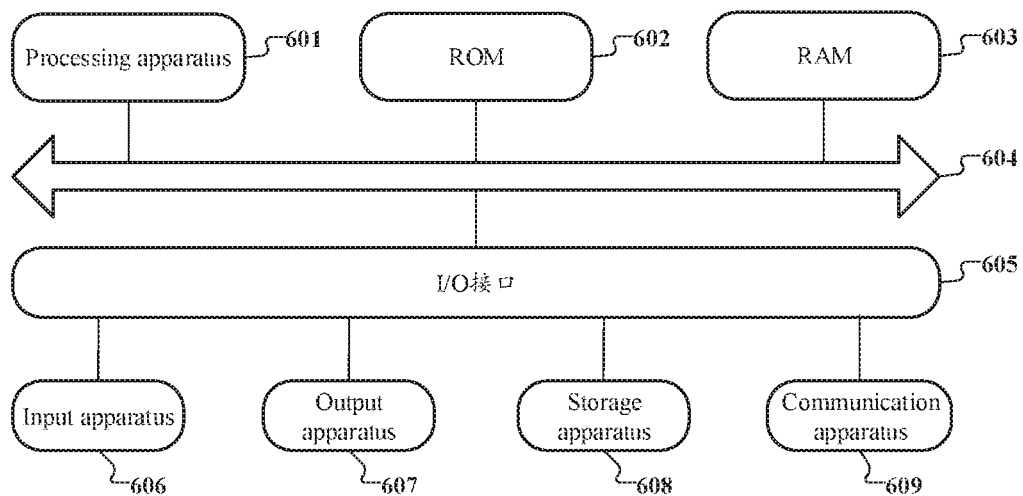
FIG. 6 is a schematic structural diagram of a computer system suitable for implementing an electronic device of an embodiment of the present disclosure.

Referring now to FIG. 6, there is shown a schematic structural diagram of an electronic device (e.g., the management server or terminal device in FIG. 1) 600 suitable for implementing embodiments of the present disclosure. Terminal devices in embodiments of the present disclosure may include, but are not limited to, mobile terminals such as a mobile phone, a notebook computer, a digital broadcast receiver, a PDA (Personal Digital Assistant), a PAD (Tablet Computer), a PMP (Portable Multimedia Player), an in-vehicle terminal (e.g., an in-vehicle navigation terminal), and the like, and fixed terminals such as a digital TV, a desktop computer, and the like. The terminal device/management server shown in FIG. 6 is merely an example and should not be construed as limiting the functionality and scope of use of the embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the system 600. The processing apparatus 601, the ROM 602 and the RAM 603 are connected to each other through a bus 604. An input/output (I/O) interface 605 is also connected to the bus 604.

Generally, the following apparatuses are connected to the I/O interface 605: an input apparatus 606 including, for example, a touch screen, a touch pad, a keyboard, and a mouse, a camera, a microphone, an accelerometer and a gyroscope; an output apparatus 607 including, for example, a liquid crystal display (LCD), a speaker and a vibrator; the storage apparatus 608 including, for example, a tape or a hard disk; and a communication apparatus 609. The communication apparatus 609 may allow the electronic device 600 to exchange data with other devices by means of a wireless communication or wired communication. Although FIG. 6 illustrates the electronic device 600 having various apparatuses, it should be understood that it is not required to implement or possess all of the shown apparatuses. More or fewer apparatuses may alternatively be implemented or possessed. Each block shown in FIG. 6 may represent one apparatus, or may represent a plurality of apparatuses as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: summarize event information into an event database in response to receiving the event information, where the event information includes an event start time, an event end time, a machine name, and an event content; associate and store event information of a same machine name; query an event database for event information including a target machine name and an event end time greater than or equal to a predetermined time before a current time and an event start time less than or equal to the current time, in response to receiving a query request including the target machine name; and output queried event information.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor. For example, the processor may be described as: a processor including a receiving unit, an association unit, a query unit, and an output unit. Here, the names of these units do not in some cases constitute a limitation to such units themselves. For example, the receiving unit may alternatively be described as "a unit for summarizing event information into an event database in response to receiving the event information."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting information, comprising:
    summarizing event information into an event database in response to receiving the event information, wherein the event information includes an event start time, an event end time, a machine name, and an event content;
    associating and storing various event information of a same machine name;
    receiving a query request including a target machine name;
    querying the event database for event information, the quired event information including the target machine name, and the quired event information satisfying: an event end time thereof being greater than or equal to a predetermined time before a current time and less than the current time and an event start time thereof being less than or equal to the predetermined time before the current time, or the event end time thereof being greater than or equal to the current time and an event start time thereof being less than or equal to the current time and greater than the predetermined time before the current time, in response to receiving the query request including the target machine name; and
    outputting queried event information.

2. The method of claim 1, wherein the query request further comprises a query start time and a query end time; and
    the method further comprises:
    querying the event database for event information including the target machine name, and the queried event information satisfying: an event end time thereof being greater than or equal to the query start time and less than the query end time and an event start time thereof being less than or equal to the query start time, the event start time thereof being less than or equal to the query end time and greater than the query start time and the event end time thereof being greater than the query end time, or the event start time thereof being less than the query start time and the event end time thereof being greater than the query end time.

3. The method of claim 1, wherein the event content comprises an event type, the event type comprising a warning event and a change event; and
    the method further comprises:
    determining a change event related to the warning event from the queried event information.

4. The method of claim 3, wherein the event content further comprises a service level; and
    the method further comprises:
    determining the change event related to the warning event from the queried event information of a same service level.

5. The method according to claim 1, wherein the outputting queried event information comprises:
    outputting the queried event information in an order from near to far according to the event end time.

6. An apparatus for outputting information, comprising:
    at least one processor; and
    a memory storing instructions, wherein the instructions when executed by the at least one processor, cause the at least one processor to perform operations, the operations comprising:
    summarizing event information into an event database in response to receiving the event information, wherein the event information includes an event start time, an event end time, a machine name, and an event content;
    associating and store various event information of a same machine name;
    receiving a query request including a target machine name;
    querying the event database for event information, the quired event information including the target machine name, and the quired event information satisfying: an event end time thereof being greater than or equal to a predetermined time before a current time and less than the current time and an event start time thereof being less than or equal to the predetermined time before the current time, or the event end time thereof being greater than or equal to the current time and an event start time thereof being less than or equal to the current time and greater than the predetermined time before the current time, in response to receiving the query request including the target machine name; and outputting queried event information.

7. The apparatus of claim 6, wherein the query request further comprises a query start time and a query end time; and the operations further comprise:

querying the event database for event information including the target machine name, and the queried event information satisfying: an event end time thereof being greater than or equal to the query start time and less than the query end time and an event start time thereof being less than or equal to the query start time, the event start time thereof being less than or equal to the query end time and greater than the query start time and the event end time thereof being greater than the query end time, or the event start time thereof being less than the query start time and the event end time thereof being greater than the query end time.

8. The apparatus of claim 6, wherein the event content comprises an event type the event type comprising a warning event and a change event; and the operations further comprise:

determining a change event related to the warning event from the queried event information.

9. The apparatus of claim 8, wherein the event content further comprises a service level; and the operations further comprise:

determining the change event related to the warning event from the queried event information of a same service level.

10. The apparatus of claim 6, wherein the outputting queried event information comprises:

outputting the queried event information in an order from near to far according to the event end time.

11. A non-transitory computer readable medium, storing a computer program thereon, wherein the program, when executed by a processor, causes the processor to perform operations, the operations comprising:

summarizing event information into an event database in response to receiving the event information, wherein the event information includes an event start time, an event end time, a machine name, and an event content;

associating and store various event information of a same machine name;

receiving a query request including a target machine name;

querying the event database for event information, the quired event information including the target machine name, and the quired event information satisfying: an event end time thereof being greater than or equal to a predetermined time before a current time and less than the current time and an event start time thereof being less than or equal to the predetermined time before the current time, or the event end time thereof being greater than or equal to the current time and an event start time thereof being less than or equal to the current time and greater than the predetermined time before the current time, in response to receiving the query request including the target machine name; and outputting queried event information.

12. The non-transitory computer readable medium of claim 11, wherein the query request further comprises a query start time and a query end time; and the operations further comprise:

querying the event database for event information including the target machine name, and the queried event information satisfying: an event end time thereof being greater than or equal to the query start time and less than the query end time and an event start time thereof being less than or equal to the query start time, the event start time thereof being less than or equal to the query end time and greater than the query start time and the event end time thereof being greater than the query end time, or the event start time thereof being less than the query start time and the event end time thereof being greater than the query end time.

13. The non-transitory computer readable medium of claim 11, wherein the event content comprises an event type the event type comprising a warning event and a change event; and the operations further comprise:

determining a change event related to the warning event from the queried event information.

14. The non-transitory computer readable medium of claim 13, wherein the event content further comprises a service level; and the operations further comprise:

determining the change event related to the warning event from the queried event information of a same service level.

15. The non-transitory computer readable medium according to claim 11, wherein the outputting queried event information comprises:

outputting the queried event information in an order from near to far according to the event end time.

* * * * *